Figure 1:
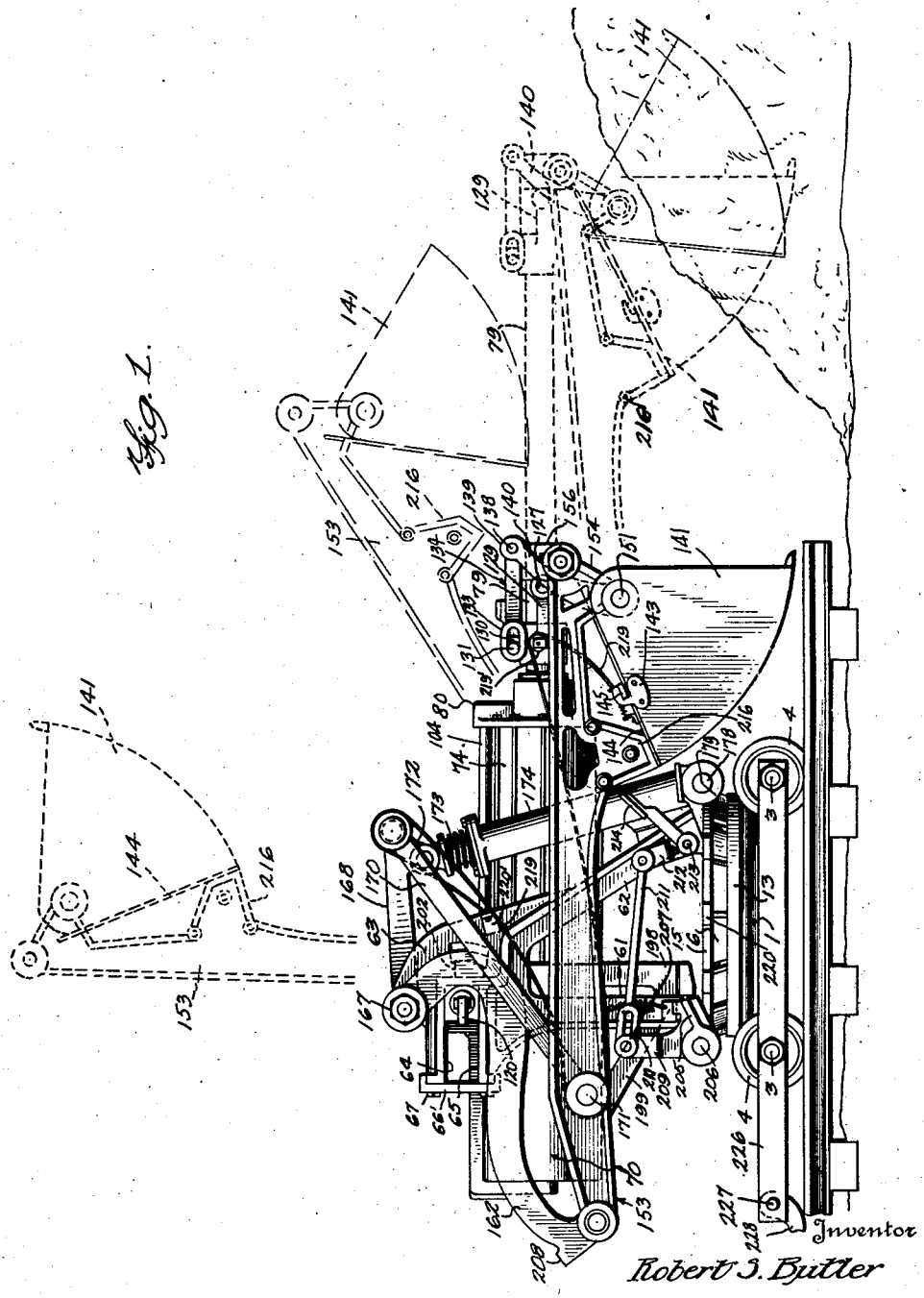

Aug. 25, 1925.

R. S. BUTLER 1,551,466

POWER OPERATED SHOVEL

Filed Dec. 24, 1923    11 Sheets-Sheet 1

Inventor
Robert S. Butler

By G.W. Earnshaw
Attorney

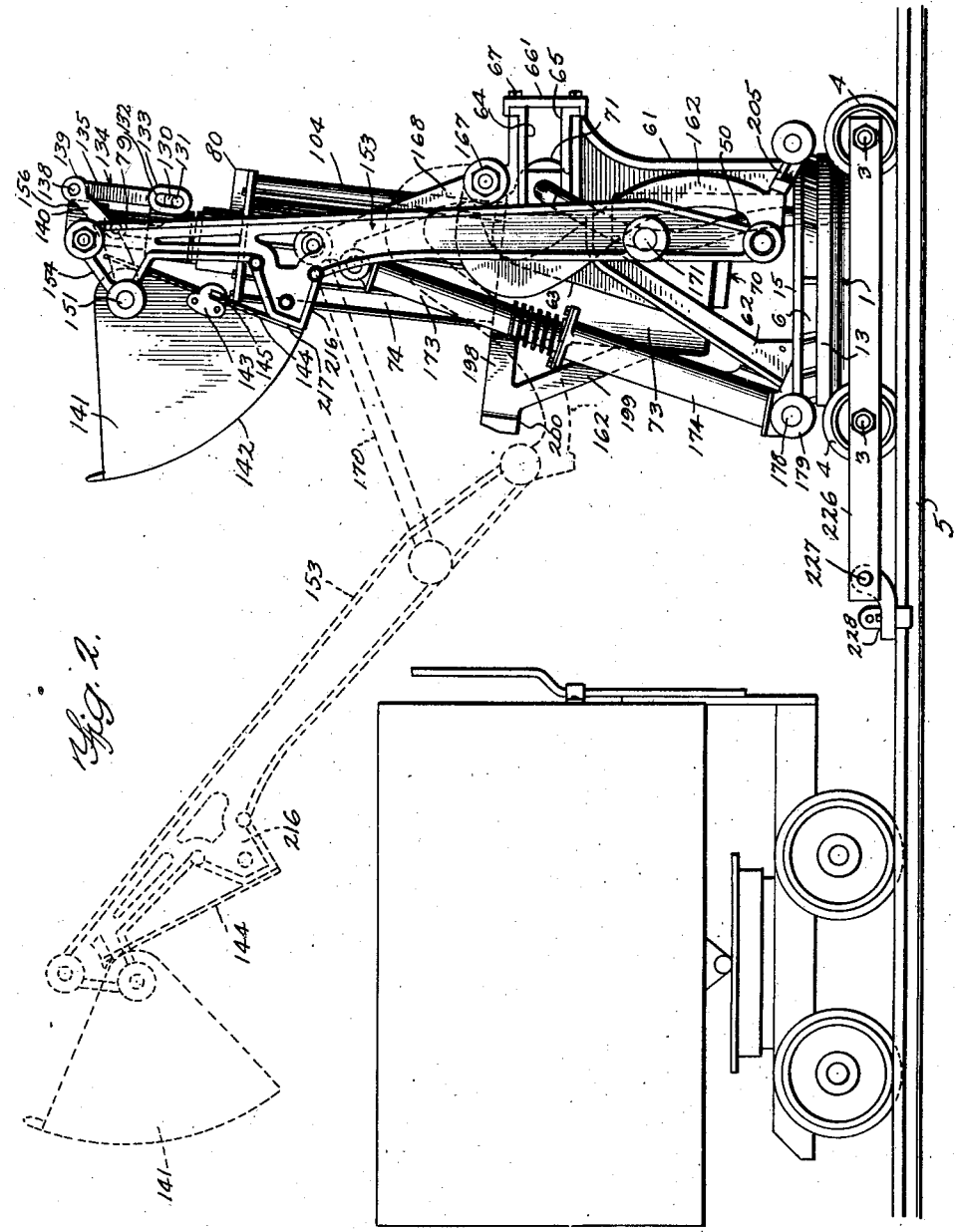

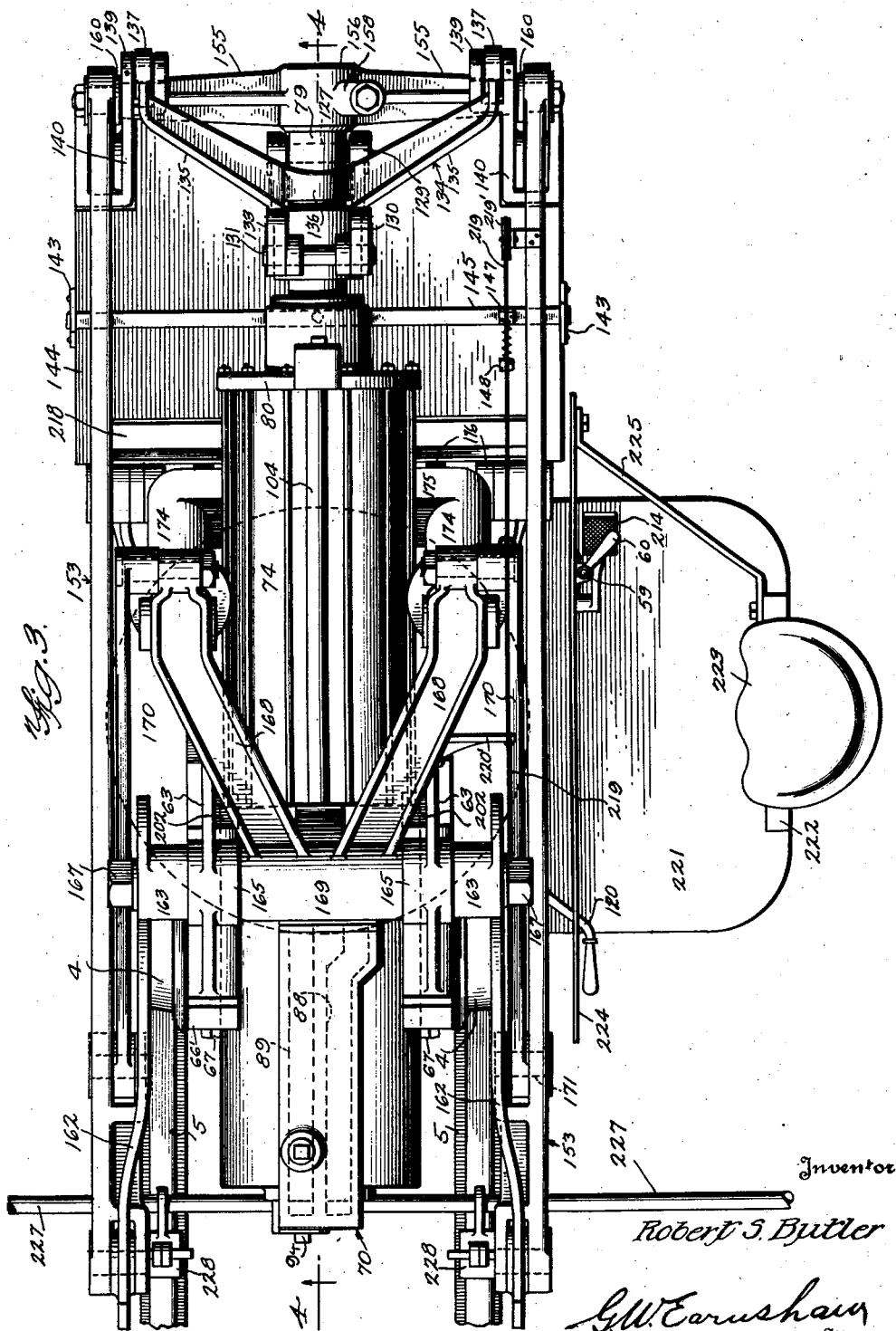

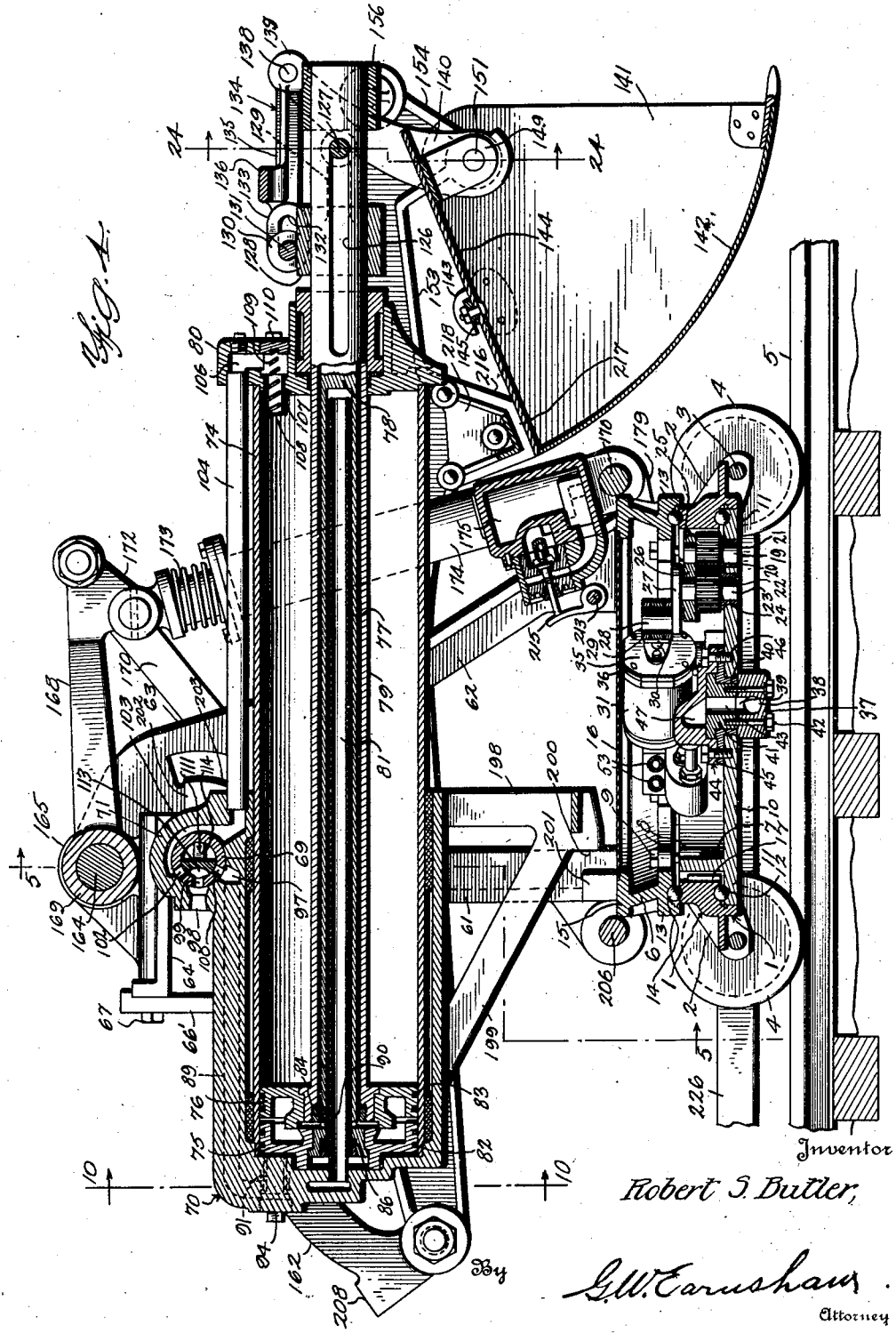

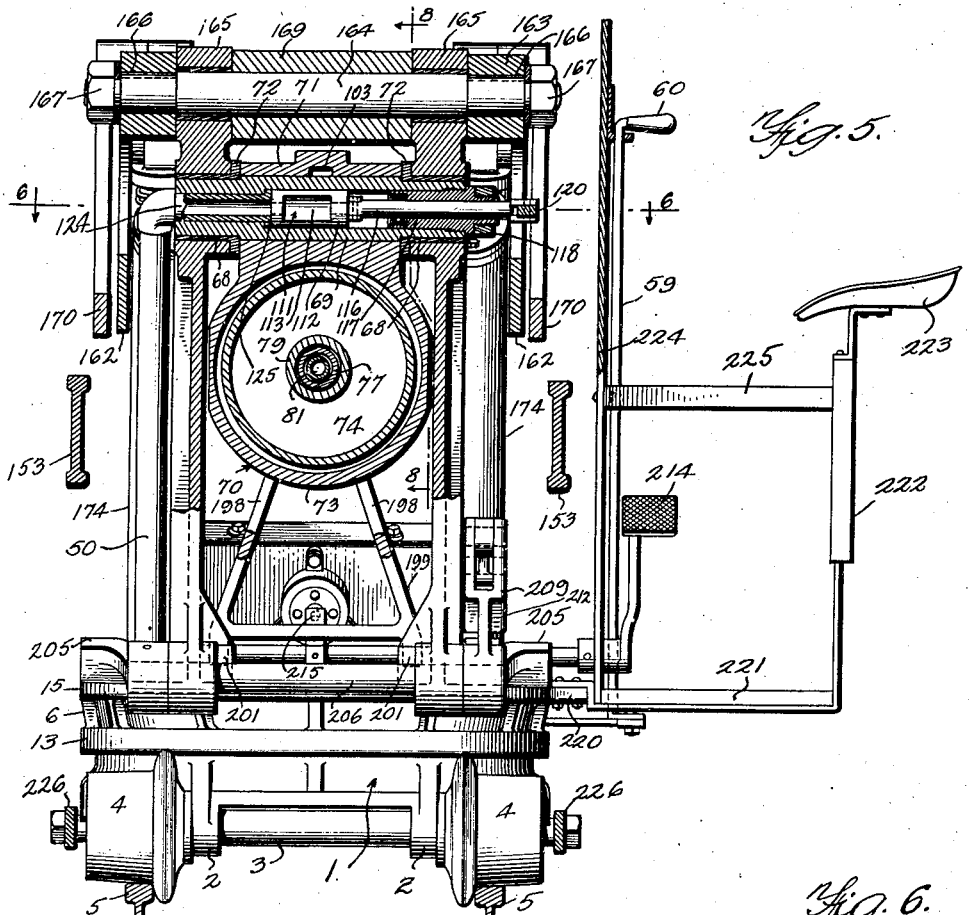

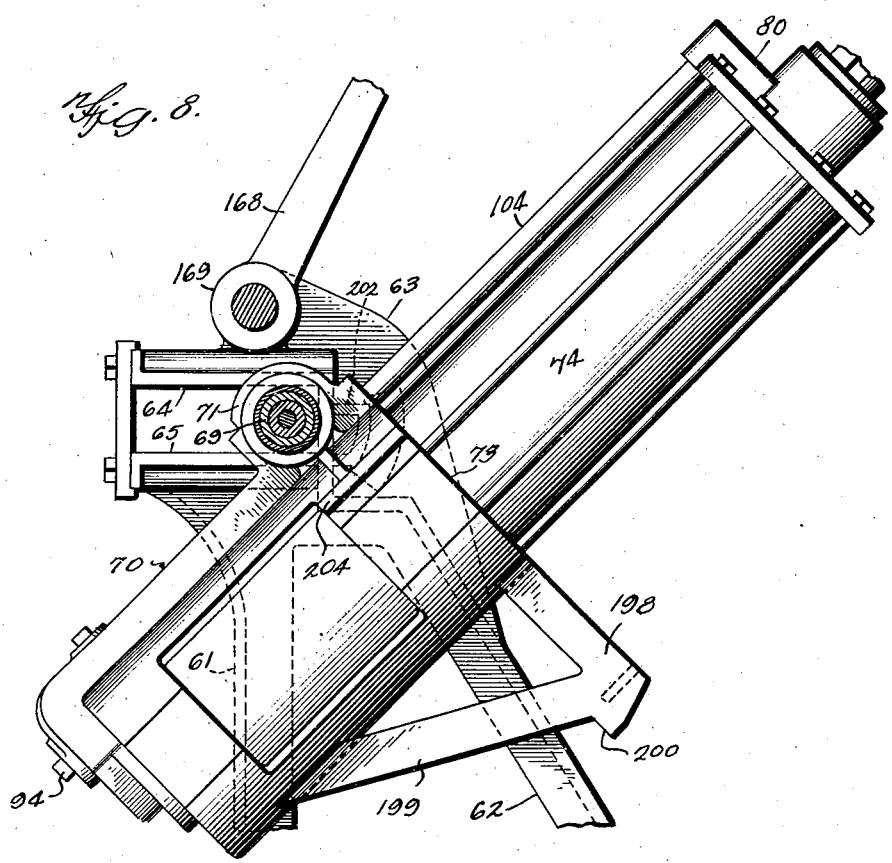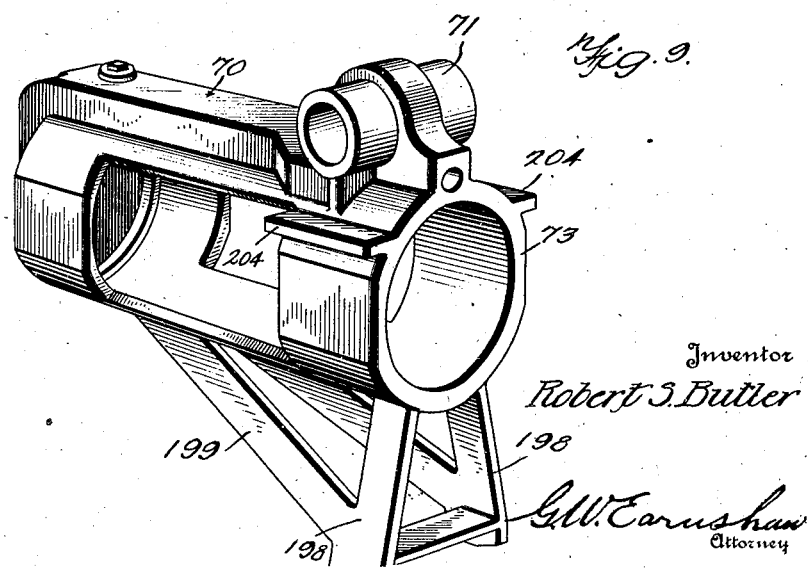

Aug. 25, 1925.
R. S. BUTLER
1,551,466
POWER OPERATED SHOVEL
Filed Dec. 24, 1923     11 Sheets-Sheet 8
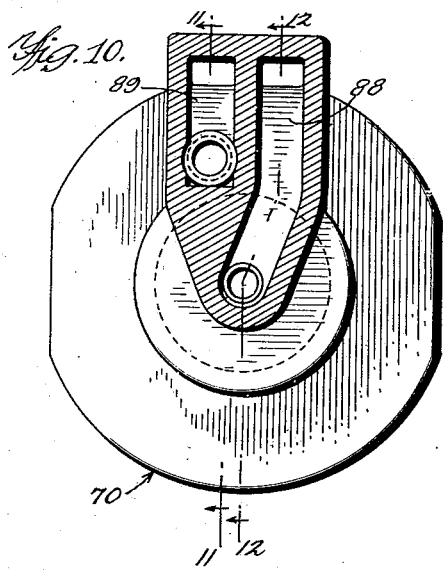
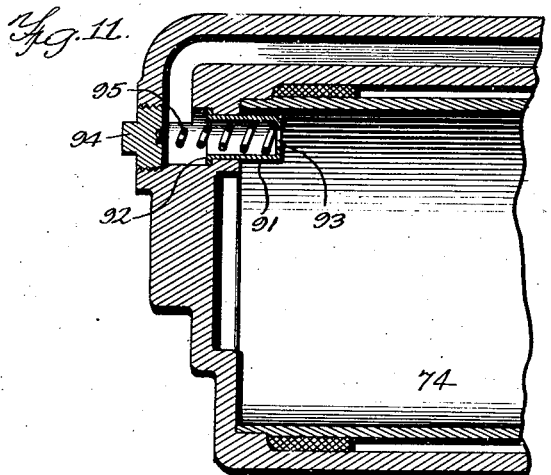
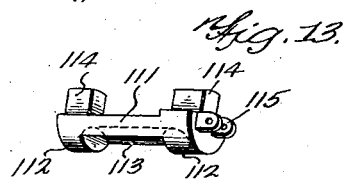
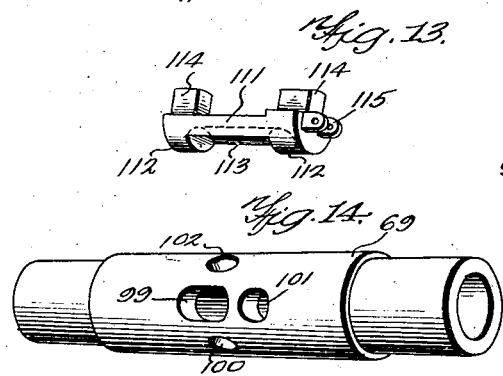
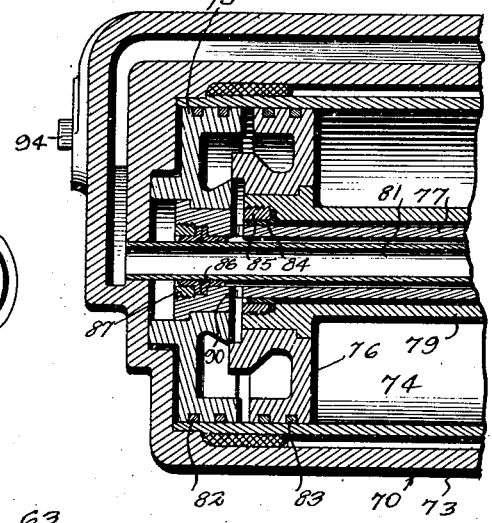
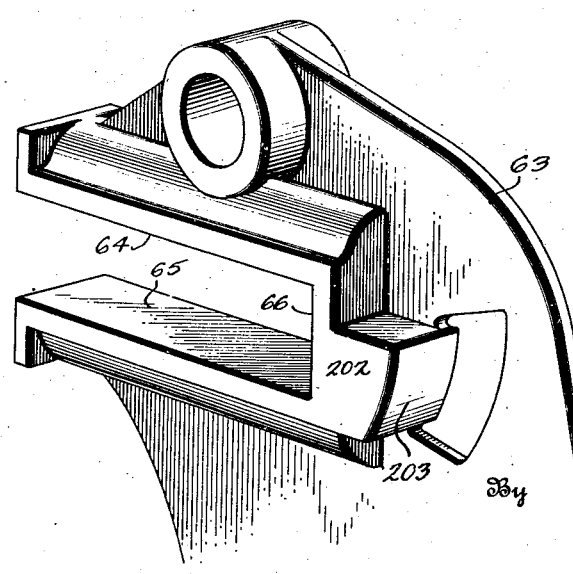
Inventor
Robert S. Butler
By G.W. Earnshaw
Attorney

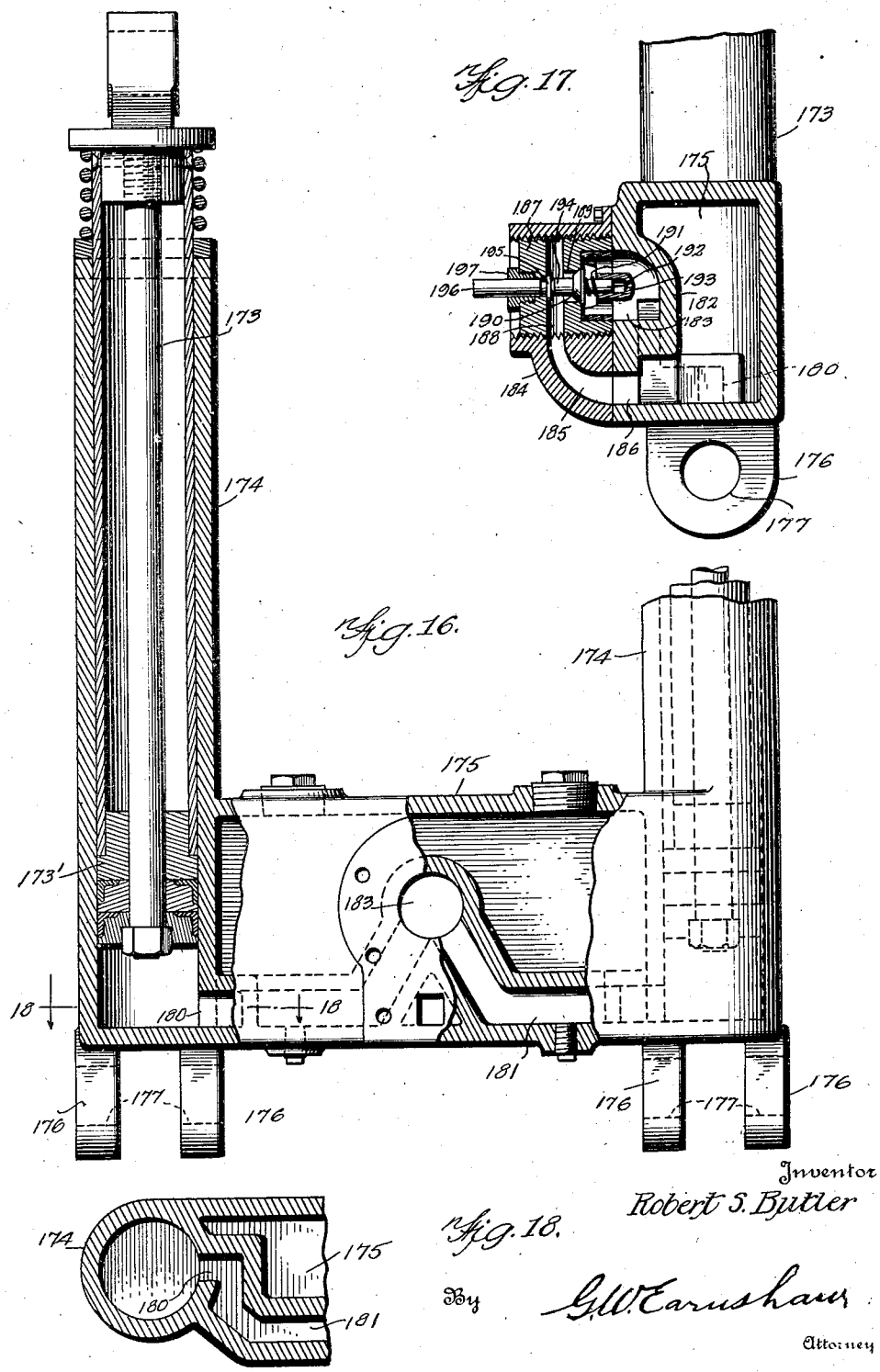

Aug. 25, 1925.
R. S. BUTLER
1,551,466
POWER OPERATED SHOVEL
Filed Dec. 24, 1923  11 Sheets-Sheet 10
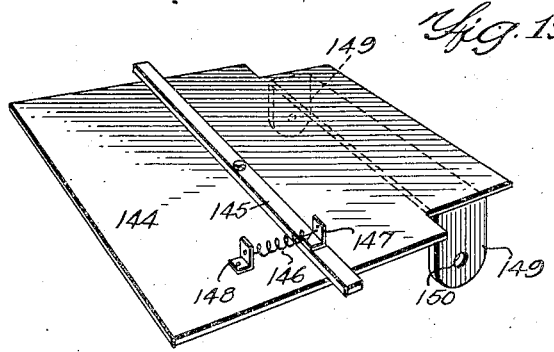
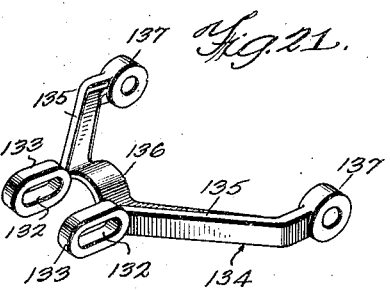
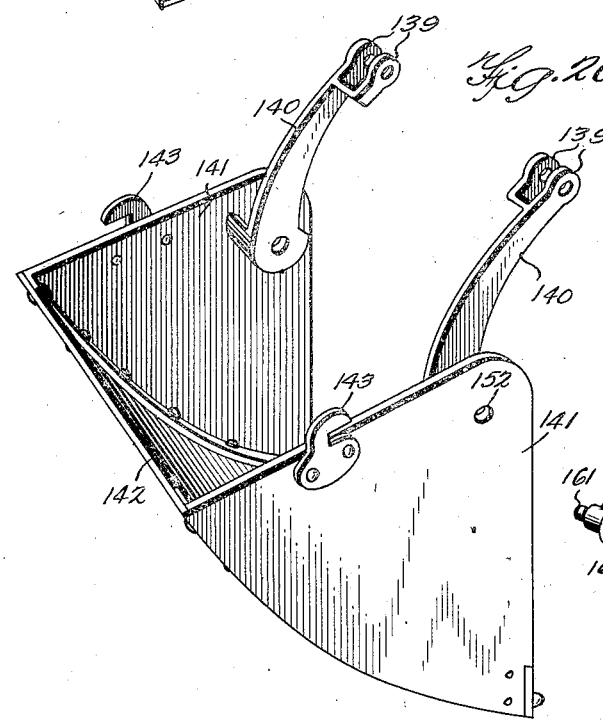
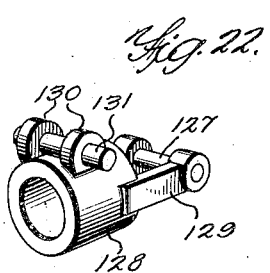
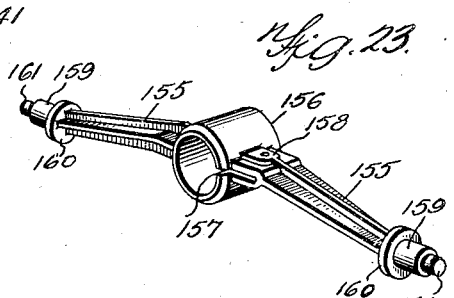
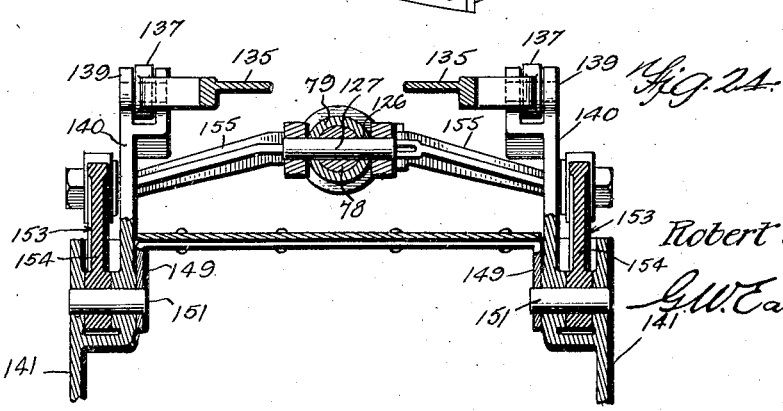
Inventor
Robert S. Butler
G. W. Earnshaw
Attorney Aug. 25, 1925.  
R. S. BUTLER  
1,551,466  
POWER OPERATED SHOVEL  
Filed Dec. 24, 1923   11 Sheets-Sheet 11

Inventor  
Robert S. Butler  
By  
G.W. Earnshaw  
Attorney

Patented Aug. 25, 1925.

1,551,466

UNITED STATES PATENT OFFICE.

ROBERT S. BUTLER, OF JOPLIN, MISSOURI.

POWER-OPERATED SHOVEL.

Application filed December 24, 1923. Serial No. 682,532.

*To all whom it may concern:*

Be it known that I, ROBERT S. BUTLER, a citizen of the United States, residing at Joplin, in the county of Jasper and State of Missouri, have invented certain new and useful Improvements in Power-Operated Shovels, of which the following is a specification.

This invention relates to power operated shovels, and is an improvement over the device shown in my copending application Serial Number 416,175, filed October 11, 1920.

An object of the invention is to provide a power operated machine having a dipper and means for operating the dipper for digging, and being further provided with means whereby the dipper may be elevated and swung at an angle to the base of the machine for the purpose of loading the material into a car or other conveyor.

An important object of the invention is the provision of means whereby the dipper and its associated parts may be arranged at an angle to the base during the digging or loading operations to permit the use of the shovel in digging operations where space is restricted, such as in underground mining.

A further object of the invention is the provision of a machine which may be employed in place of the ordinary scraper for use in small drifts and sub-levels and may further be employed in work now performed by large machines, such as digging in large drifts, tunnels, and rooms.

A further object of the invention is the provision of a relatively small flexible machine which may be readily moved on a mine cage from one level to another and which is available for loading in drifts and for comparatively heavy loading in large tunnels.

A further object is the provision of a simple, light, but rugged machine with low power requirements adapted to a wide range of service.

A further object is the provision of improved means for elevating the shovel after the digging operation for dumping.

A further object is the provision of a machine in which any of the operations, such as the forward movement of the shovel, known as crowding, the elevating movement or the reaching movement prior to dumping may be arrested by the operator at any point and the next operation of the machine immediately begun.

Figure 7:
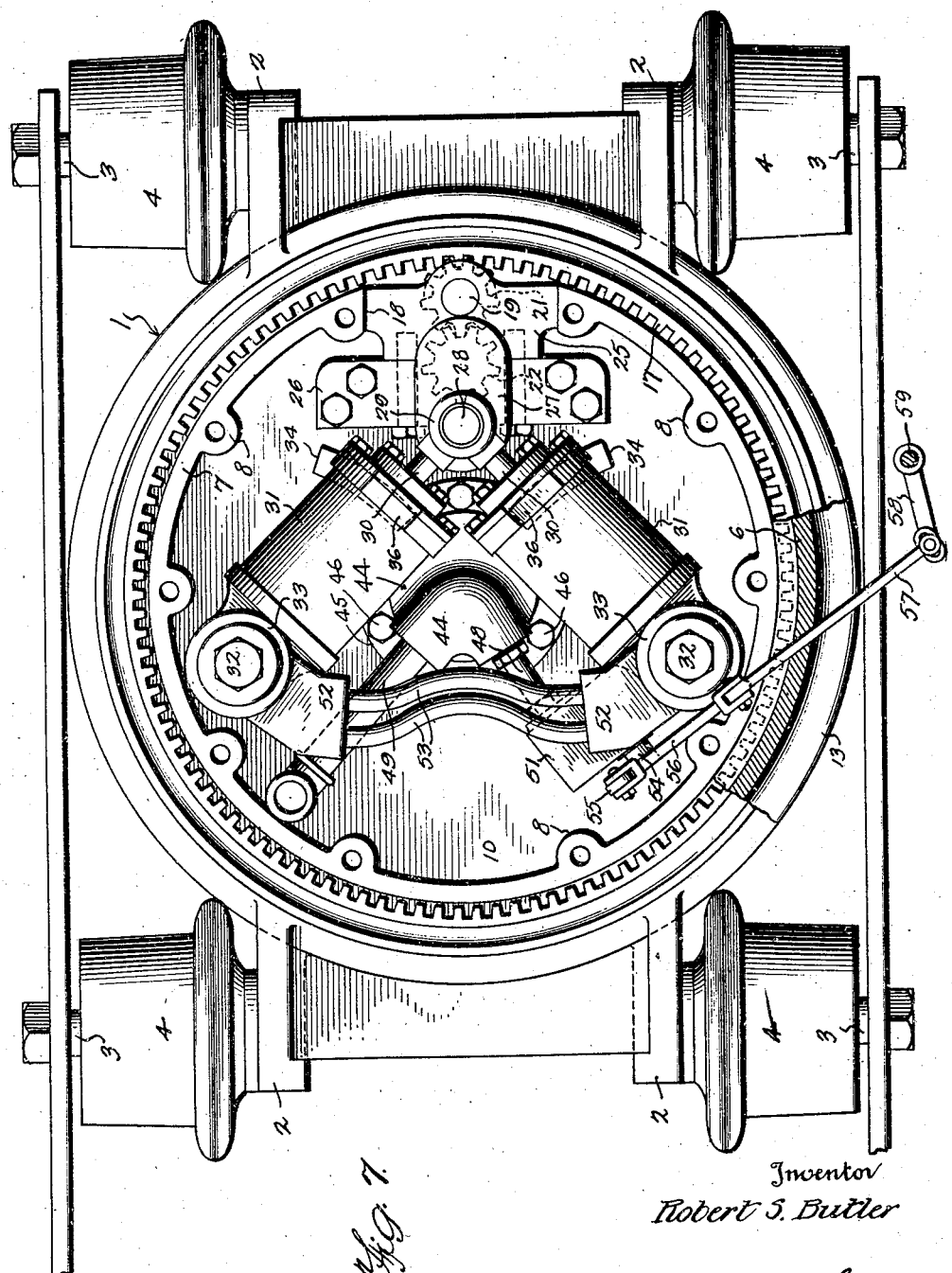
Figure 25:
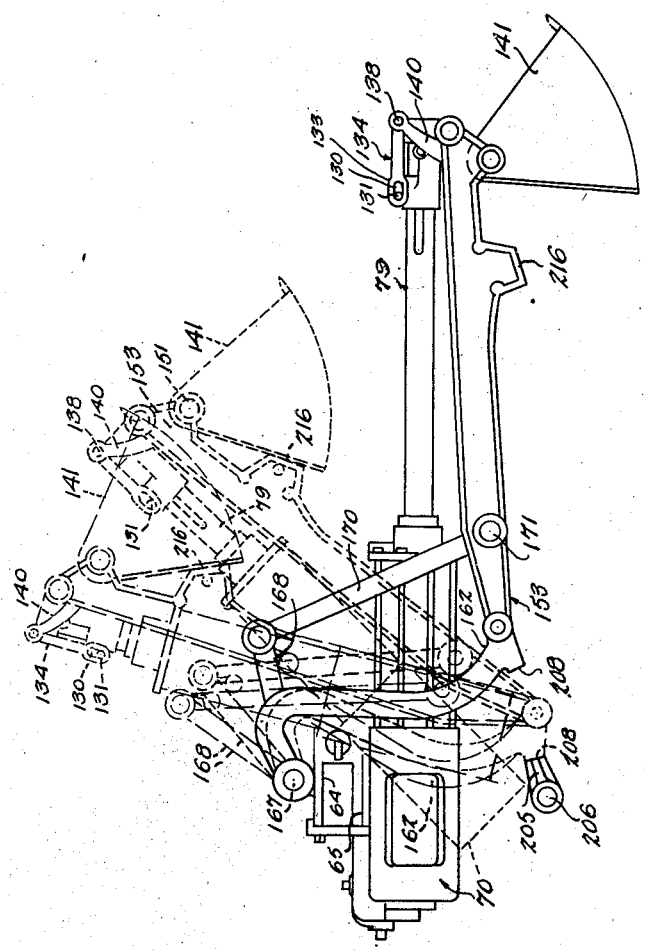

In the accompanying drawings, I have shown one embodiment of the invention. In this showing:

Figure 1 is a side elevation, the operator's platform being removed,

Figure 2 is a side elevation showing the cylinder, dipper and associated parts in raised position, the operator's platform being removed, Figure 3 is a plan view, Figure 4 is a longitudinal vertical sectional view on line 4—4 of Figure 3, Figure 5 is a transverse vertical sectional view on line 5—5 of Figure 4, Figure 6 is a transverse horizontal sectional view on line 6—6 of Figure 5, Figure 7 is a plan view of the base, Figure 8 is a detail sectional view on line 8—8 of Figure 5, Figure 9 is a perspective view of the cylinder supporting yoke, Figure 10 is a detail sectional view on line 10—10 of Figure 4, Figure 11 is a similar view on line 11—11 of Figure 10, Figure 12 is a similar view on line 12—12 of Figure 10, Figure 13 is a perspective view of the valve, Figure 14 is a similar view of the valve sleeve, Figure 15 is a detail view of a portion of the frame, Figure 16 is a front elevation of the dash pots, parts being shown in section, Figure 17 is an enlarged detail sectional view of a portion of the dash pot mechanism showing the control valve, Figure 18 is a detail sectional view on line 18—18 of Figure 16, Figure 19 is a perspective view of the dipper lid, Figure 20 is a similar view of the dipper, Figure 21 is a similar view of the dipper yoke, Figure 22 is a similar view of a collar to which the yoke is connected, Figure 23 is a perspective view of the cross head connected to the outer piston rod, Figure 24 is a detail sectional view on line 24—24 of Figure 4, Figure 25 is a diagrammatic view of the cylinder, piston rod, shovel and connecting beams showing various positions of these parts between the reaching position shown in dotted lines in Figure 1 of the drawings and the elevated position shown in full lines in Figure 2 of the drawings.

Referring particularly to Figures 4 and 7 of the drawings, the machine is provided with a base consisting of an annular member 1, having suitable bearings 2 for the reception of front and rear axles 3. Traction wheels 4 are mounted on these axles and are adapted to travel on the usual rails 5. The cylinder and upper frame are rotatably supported on the base by means of a turn-table. A rotatable member consisting of an upper ring 6 and a lower ring 7 is rotatably mounted on the base. These members are provided with ears 8, adapted to receive bolts 9, by means of which they are secured to each other. As shown, the lower member is provided with a bottom plate 10, which extends beyond the ring forming a flange 11, arranged beneath a portion of the base. The flange 11 and the adjacent portion of the base are provided with race ways for the reception of ball bearings 12. The upper ring 6 is provided with a bottom flange 13, arranged over the base and this flange and the adjacent portion of the base are provided with race ways for the reception of bearings 14. The upper edge of the upper ring is also provided with a flange 15 and a closure plate 16 is secured to this flange.

The base is provided with a ring gear 17 and the lower ring is provided with a cut out portion 18. A stub shaft 19 is mounted in a bushing 20 in the bottom plate 10 of the lower ring, adjacent the cut out portion of the ring, and this shaft is adapted to receive a pinion 21, meshing with the ring gear 17. A second pinion 22 meshes with the pinion 21 and this pinion is mounted on a stub shaft 23, received in a bushing 24 in the bottom plate 10. Above the pinions, there are provided a pair of bearing members 25 and 26, which are secured to each other by suitable fastening elements. The shaft 23 extends through the bearing members 26 and a crank 27 is secured to this shaft. The crank 27 carries a pin 28 on its opposite end, adapted to enter a sleeve 29 formed on the ends of a pair of piston rods 30. These piston rods are connected to pistons (not shown), arranged in cylinders 31 of an oscillating engine. The cylinders are pivotally mounted on pins 32, bolted to the bottom plate 10, the cylinders being provided with ears or sleeves 33, arranged around the pins. The inner ends of the cylinders are adapted to rest upon lugs 34, extending upwardly from the bottom plate. The inner ends of the cylinders are provided with cylinder heads 35, which are flattened, as at 36 (see Figure 4) to fit beneath the closure plate 16.

The cylinders are connected to a source of pressure by means of a swivel connection extending through the bottom plate 10. As shown, the bottom plate is provided with an opening and a member 37 is arranged beneath this opening. This member is provided with a passage 38, extending horizontally and is further provided with a vertical port or passage 39, extending upwardly. A bushing 40 is arranged in the opening in the bottom plate and this bushing is adapted to receive and support a member 41, which extends through the opening and is secured to the lower member 37 by means of bolts 42. The member 41 is provided with a passage 43, forming a continuation of the passage 39 in the lower plate. A head 44 is arranged over the member 41 and this head is provided with a flange 45, extending downwardly beyond the member 41 to retain it on its seat. Suitable fastening elements 46 are passed through this flange and the bushing 40 and are received in the bottom plate. The head 44 is provided with a passage 47 which, as shown, is substantially V-shaped and is connected to outlet pipes 48 and 49. The pipe 49 extends to a point near the periphery of the base and is connected to a flexible hose 50 by means of which air is delivered to the cylinder arranged above the base. The pipe 48 is connected to a valve chest 51, in which a plug valve (not shown) is arranged. The plug valve is adapted to control communication to the engine cylinders through the cylinder valve chest 52, which is connected to the main valve chest by conduits 53. The plug valve is provided with a stem 54 having a crank 55 connected thereto. The crank is in turn connected to a link 56 and the end of the link is connected to an arm 57 which in turn is connected to a crank 58, arranged on the bottom of a vertical lever 59. The upper end of this lever is provided with an operating handle 60.

The frame is secured to the upper ring 6 and is adapted to rotate therewith. As shown, the frame consists of substantially vertical members 61 and inclined members 62 arranged on opposite sides of the machine. The upper ends of these arms form frames 63, arranged on opposite sides of the machine. Each of these frames is provided with a recessed portion forming upper and lower guides 64 and 65, substantially parallel to each other and provided with a stop 66 at the front. The rear of the guides is closed by plates 66', secured to the frames by means of bolts 67. A bushing 68 is arranged in each of these guides and these bushings are provided with flat upper and lower faces adapted to engage the upper and lower walls 64 and 65. These bushings are adapted to receive a trunnion 69, shown in detail in Figure 14 of the drawings. A cylinder yoke 70 (see Figure 9) is provided with a sleeve 71, adapted to receive the trunnion 69. As shown (see Figure 5), the ends of the sleeve contact with flanges 72, formed on the bushings 68. The yoke is provided with a cylindrical skeleton frame 73, adapted to receive the rear end of the main cylinder 74. An inner piston 75 and an outer piston 76 are mounted in this cylinder. The inner piston is provided with a tubular piston rod 77, the outer end of which is solid, as at 78, and the outer piston is provided with a tubular piston rod 79, surrounding the inner piston rod. The outer end of the cylinder is provided with a head 80, through which the cylinder rods pass. A tube or conduit 81 is arranged within the tubular portion 77 of the inner piston rod and this tube extends from the rear end of the cylinder to a point adjacent the forward end. The pistons are provided with suitable packing 82 and 83, around their peripheries, to prevent leakage. The outer piston rod is provided with suitable packing 84 at its inner end, retained in position by means of a plug 85, engaging the exterior of the piston rod 77 to prevent leakage. The inner piston rod is likewise provided with suitable packing 86, retained in position by means of a plug 87 and engaging the tube 81 to prevent leakage. A pair of ports 88 and 89 are formed in the inner cylinder head, and the port 88 communicates with the tube 81. Air passing through the tube 81 is delivered to the interior of the inner piston rod 77 and this piston rod is provided with suitable passages 90, arranged inwardly of the outer piston to permit delivery of air into the cylinder between the pistons. The passage 89 communicates with an opening extending through the cylinder head to deliver air to the cylinder behind the pistons. As shown (see Figure 11), a cup shaped member 91 is arranged in this opening and the end of the cup-shaped member is provided with a flange 92, engaging the shoulder formed in the opening. The inner end of the cup-shaped member is provided with an opening 93, communicating with the interior of the cylinder. The cylinder head is provided with a threaded opening in alinement with the cup-shaped member 91, adapted to receive a plug 94, and a spring 95 is arranged between the bottom of the cup-shaped member and the plug to normally retain the cup-shaped member in the position shown. The passages 88 and 89 extend through a thickened portion in the top of the cylinder yoke and communicate with ports 96 and 97, in the sleeve 71. The ports 96 and 97 are arranged out of alinement circumferentially of the sleeve. The sleeve is provided with an exhaust port 98, which is circumferentially in alinement with the port 97 and vertically in alinement with the port 96. The trunnion 69 is provided with an exhaust opening 99, communicating with the exhaust opening 98 in the sleeve. The trunnion is further provided with an opening 100, arranged beneath the exhaust opening 99 and communicating with the opening 96 in the cylinder. It is further provided with an opening 101, communicating with the opening 97 in the sleeve. An opening 102 is formed in the trunnion adjacent the exhaust opening and communicates with a passage 103, extending circumferentially of the sleeve. The other end of this passage is connected to a pipe 104, which is in turn connected to a passage 106 in the outer cylinder head 80. This passage communicates with a cup-shaped member 107, arranged in an opening in the cylinder head and the inner end of the cup-shaped member is provided with an opening 108, communicating with the interior of the cylinder. The cup-shaped member is normally retained in the position shown in Figure 4 of the drawings by means of a spring 109, one end of which engages a plug 110. A valve 111 (see Figure 13) is arranged within the trunnion. This valve is of a modified Corless type and is capable of reciprocating movement and oscillating movement to connect the passages 88 and 89 and pipe 104 to the source of fluid pressure. As shown, the valve is provided with substantially semi-circular portions 112 at each end and a cut out portion 113 between the semi-circular portions. The opposite side of the valve is provided with a pair of lugs 114, adapted to engage the opposite inner face of the trunnion. Ears 115 are arranged on one end of the valve and these ears 115 are adapted to receive a lever 116 extending through a bushing 117 mounted in one end of the trunnion. A collar 118 is mounted on this bushing and is adapted to receive an arm or bracket 119. A hand lever 120 is connected to the lever 116 by means of a pin 121 and this hand lever is provided with a pin 122, adapted to be received in a forked end 123 of the arm or bracket 119. An inlet pipe 124 is arranged in the opposite end of the trunnion and this pipe is connected to the flexible hose 50 by means of which the air or other fluid is delivered from the base of the machine. The pipe 124 forms a swivel connection with the end of the trunnion and is provided with a flange 125 on its inner end, adapted to engage a shoulder formed in the central bore of the trunnion. The air pressure within the trunnion forces the flange against the shoulder, forming an air tight connection.

A portion of the outer piston rod 79 extends from the cylinder and is provided with a slot 126 and this slot is adapted to receive a pin 127, carried by the inner piston rod. A collar 128 is mounted on the outer piston rod and this collar is provided with forwardly extending ears 129, having openings formed in their forward ends to receive the pin 127. The collar is also provided with a pair of ears 130, arranged above the piston rods and these ears are adapted to receive a pin 131. The ends of the pin 131 are received in elongated slots 132, formed in ears 133, on the rear end of a yoke 134. The yoke consists of a pair of diverging arms 135, the rear ends of which are connected by a curved portion or saddle 136. The forward ends of these arms are provided with ears 137, having openings therein for the reception of pins 138. These pins are received in openings in ears 139, formed on the upper ends of dipper arms 140. As shown, the dipper arms are each provided with a pair of spaced ears 139, and the ears 137 are arranged between the spaced ears. The lower ends of the arms 140 are secured to the sides 141 of the dipper. As shown, these sides are formed of arcuate plates and a curved bottom 142 is secured to the sides in any suitable manner. The upper edges of the sides are provided with oppositely extending latches 143, and the dipper is provided with a lid 144, adapted to be retained in position by means of these latches. As shown, a latch bar 145 extends transversely of the dipper lid and projects beyond each side to be engaged by the latches 143. The latch bar is normally retained in operative position by means of a spring 146, secured to a clip 147, formed on the latch bar and to a similar clip 148, secured to the dipper lid. The forward end of the dipper lid is provided with depending ears 149, having openings 150 formed therein. These ears extend downwardly, as shown in Figure 24 of the drawings, adjacent the arms 140 and the openings 150 are adapted to receive pivot pins 151 by means of which the dipper lid is pivotally supported.

The pivot pins 151 are also received in openings 152 extending through the side walls of the dipper and the arms 140, which arms are slightly spaced from the inner wall of the dipper. A dipper beam 153 is arranged on each side of the machine, extending substantially throughout the length of the machine and the forward ends of the dipper beams are provided with depending portions 154, which extend into the spaces between the arms 140 and the side walls of the dipper and are provided with openings for the reception of the pins 151. The dipper beams form the support for the dipper and the dipper is adapted to oscillate on the pins 151 in digging and dumping. The forward ends of the dipper beams are supported by means of a cross head consisting of a pair of arms 155 and a collar 156. The collar is arranged around the outer piston rod 79 and, as shown, is slotted, as at 157. The collar is provided with an ear 158, arranged above a portion of one of the arms 155 and a screw or bolt is adapted to be passed through openings in the collar and the arm to tighten the collar on the piston rod. The outer ends of the arms are provided with bearing portions 159, adapted to be received in openings in the dipper beam. Stops 160 may be provided at the inner ends of the bearing portions to retain the beams in proper position and the outer ends of the arms are provided with reduced threaded portions 161, for the reception of nuts to retain the beams in position.

The rear ends of the beams are pivotally connected to guide arms, shown as substantially S-shaped levers 162, arranged on opposite sides of the machine. These guide arms are provided with hubs 163 at their upper ends, adapted to receive a supporting pin or shaft 164, mounted in extensions 165 of the side frames and arranged above the sleeve 71. The hubs 163 are keyed to the shaft 164, as indicated at 166, and the ends of the shaft are adapted to receive nuts 167 or other fastening elements. A pair of diverging arms 168, forming a yoke, are arranged above the cylinder and these arms are connected to a hub 169, loosely mounted on the shaft 164 between the bearing portions 165. The forward ends of the arms 168 are pivotally connected to arms 170, arranged on opposite sides of the machine and the other ends of the arms 170 are pivotally connected to the dipper beams, as at 171.

The diverging arms 168 are provided with depending portions 172 and piston rods 173 are connected to these depending portions. The piston rods are provided with pistons 173' mounted in the cylinders 174 of a suitable dash pot. The dash pot mechanism is arranged on the frame of the machine and consists of a substantially U-shaped member, the legs of which form the cylinders 174 and the base of which forms a reservoir 175 for oil or other liquid. The dash pot mechanism is pivotally supported on the base of the machine. As shown, ears 176 are arranged on the bottom of the dash pot mechanism and these ears are provided with openings 177 for the reception of pins 178 passing through openings formed in bearing members 179 carried by the upper ring 6. The cylinders 174 are provided with inlet openings 180, communicating with passages 181. The reservoir 175 is provided with a partition 182, forming a chamber 183, the passages 181 communicating with this chamber. A bonnet 184 is arranged on the outer face of the reservoir and is provided with a passage 185, communicating with the interior of the reservoir by means of a port 186. This bonnet is provided with a threaded opening adapted to receive a plug 187. The plug is provided with a transverse passage 188, communicating with the passage 185, and is further provided with a central bore 189. This bore is provided with a valve seat adapted to be engaged by a valve 190. The valve is normally retained on its seat by means of a coil spring 191, arranged around the valve stem 192. The valve stem is adapted to reciprocate in a guide or cage 193. Beyond the valve, the bore 189 is enlarged and communicates with the chamber 183, as shown. The valve stem is extended beyond the valve, as shown at 194, and is adapted to be engaged by a head 195, formed on a reciprocating lever 196 to permit manual operation of the valve. As shown, this lever passes through the plug 187 and through a central opening in a packing nut 197.

The cylinder yoke is provided with a pair of depending arms 198 which are arranged at the front and diverge and which may be connected to the cylinder yoke by inclined arms 199. The lower portions of the arms 198 are provided with substantially flat faces 200. The frame of the machine is provided with lugs 201, adapted to be engaged by the faces 200 when the fluid is introduced into the inner end of the cylinder to force the pistons outwardly and move the shovel forwardly in the crowding operation.

When the cylinder, dipper and associated parts are elevated for dumping, means are provided to prevent the bushing 68 from moving rearwardly in the guides formed by the flat faces 64 and 65. As shown, the frame of the machine is provided with a block or extension 202, arranged in front of each of the bushing guides and these blocks are provided with curved faces 203, curved on an arc from the center of the bushing 68, when the bushing is in a position at the front of the guide. The cylinder yoke is provided with lateral extensions 204, which are adapted to engage the curved faces 203 and thus prevent rearward movement of the bushing and its associated parts when the parts are in an elevated or inclined position.

Suitable means are provided to lock the dipper beams against rearward movement when they are in extended position whereby introduction of air or other fluid into the outer end of the cylinder will cause the cylinder and its associated parts to swing on its pivot to elevate the dipper. With the dipper in the dotted line position shown in Figure 1 of the drawings, introduction of air into the outer end of the cylinder moves the pistons inwardly. The rearward movement of the pistons is transmitted to the dipper beams through the cross head 155 and this tends to swing the guide arms 162 about the shaft 164 as a pivot. The forward movement of the beams has caused the arms 170 to assume a position nearer to the vertical and raise the outer end of the yoke formed by the diverging arms 168. When the pistons move rearwardly, the dash pots prevent the diverging arms from being lowered and the cylinder, dipper and associated parts move to a slightly elevated position, as indicated in broken lines in Figure 1 of the drawings. The arms 170 support the dipper through the dipper beams, at the pivots 171, and these pivots, and the pivots between the guide arms 162 and the dipper beams act as a double fulcrum to raise the dipper off the ground. During this time, the lower ends of the guide arms travel rearwardly in a reverse direction over a portion of the arc described by them during the forward movement of the pistons and means are provided to arrest this rearward movement and cause the cylinder, dipper and associated parts to swing to a substantially vertical position when air pressure is introduced into the forward end of the cylinder. As shown, suitable latches 205 are mounted on a shaft 206 adjacent the rear of the base. These latches are normally retained in raised position by means of a spring 207. During the forward movement of the guide arms, they ride over the latches 205 and depress them. The lower ends of the guide arms are provided with flattened portions 208, which are adapted to be engaged by the latches 205 on their return movement.

Suitable means are provided for releasing the latches 205 and the dash pots to permit the cylinder, dipper and associated parts to be lowered after the contents of the dipper have been dumped. As shown, an arm or crank 209 is secured to the shaft 206 and extends upwardly therefrom. This crank is provided with a pin adapted to be received in a slot 210 formed in a link 211. The forward end of this link is pivotally connected to a crank 212 formed on an operating shaft 213. A suitable pedal 214 is carried by the shaft, whereby the shaft may be revolved by depressing the pedal. The shaft is further provided with a crank or arm 215, adapted to engage the lever 196 to open the valve 191 and permit the fluid in the cylinders 174 to flow into the reservoir 175 and thus release the yoke formed by the diverging arms 168 and permit it to swing about the shaft 164, as a pivot and return to normal position.

The dipper beams are provided with depending portions 216, adjacent their forward ends and these depending portions are provided with inclined lower faces 217, adapted to engage the dipper lid and retain it in position. The depending portions 216 may be connected by a transverse member 218, forming a brace.

Suitable means are provided for releasing the latch bar 145 from the catches 143 when the dipper is in dumping position. A flexible cable 219 is connected to the clip 147 formed on the latch bar and this cable passes upwardly over an idler pulley 219' carried by one of the dipper beams. The cable is then passed rearwardly over the hub surrounding the pivot point 171 and is then extended forwardly and upwardly over the pivot pin connecting the arm 170 to the diverging arm 168. The end of the cable is fastened on a bracket 220' carried by the frame of the machine.

An operator's platform is arranged on one side of the machine and supported from the base. As shown, suitable lugs 220 are secured to the upper ring 6 of the base and a platform 221 is secured to these lugs. A standard 222 extends upwardly from the platform and is adapted to receive a seat 223. A vertically disposed partition wall or shield 224 is arranged between the platform and the machine. A guard rail 225 extends from the seat support to the shield, as shown. As shown, the valve handle 60 and the latch release pedal 214 are arranged above the operator's platform and are readily accessible in the operation of the machine.

The base of the machine is provided with side bars 226, which extend rearwardly and are adapted to receive a transverse stabilizing bar 227. This bar extends an appreciable distance on each side of the machine and is employed to prevent the machine from tipping when the upper part is arranged at an angle to the base. Rail clamps 228 may also be employed to retain the machine in a set position.

In operation, the machine is capable of successive steps whereby the dipper is forced into a bank or pile of material and is then oscillated to fill the dipper, raised to an elevated position and turned around the base as an axis and then extended over a cart, car, or other vehicle body into which the contents of the dipper are to be dumped, then returned to its original elevated position and then lowered to the starting position. These operations are generally referred to as crowding, digging, elevating, revolving, reaching, dumping, returning, and recovering. An important feature of the device is that it is not a cycle machine and any of the operations may be stopped at any time. Thus the crowding may be discontinued before the pistons travel the full length of the cylinder, and the digging step begun, or crowding and digging may be accomplished simultaneously.

With the parts in the position shown in full lines in Figure 1 of the drawings, the pistons 75 and 76 are at the inner end of the cylinder, as shown in Figure 4 of the drawings. The valve 111 is swung in a clockwise direction to connect the forward end of the cylinder with the exhaust port 98 and connect the passage 89 to the source of fluid through the pipe 50. The pistons then move outwardly, moving the dipper forwardly to the dotted line position shown in Figure 1 of the drawings. This is the crowding step, and places the dipper in proper position for digging. During this operation, the guide arm 162 will swing about the shaft 164 as a pivot and assume a position over the base. At the same time, the forward movement of the dipper beams 153 causes the lever 170 to assume a semi-vertical position and raise the outer end of the yokes formed by the diverging arms 168. This raises the piston rods 173 in the dash pot cylinders 174 and the suction created unseats the valve 190 and allows oil or other fluid to flow from the reservoir 175 into the bottom of cylinders 174. The crowding step may be continued until the pistons assume a position adjacent the outer end of the cylinder or may be terminated at any time intermediate the full line position shown in Figure 1 of the drawings and the dotted line position shown.

During the crowding operation, the flat faces 200 of the depending arms 198 of the cylinder yoke engage the lugs 201. This places the thrust on the machine at a comparatively low point and removes any strains from the cylinder supporting mechanism. It further prevents the front end of the device from tipping during the crowding operation. The bushings 68 move rearwardly in the guides to cause the flat faces 200 to engage the lugs 201 at the beginning of the crowding operation.

At the end of this step, the parts are in position for the digging operation which is accomplished by swinging the dipper around the pins 151 as a pivot. To accomplish this, the fluid is admitted to the space between the pistons through the passage 88. The valve 111 is moved inwardly by moving the handle 120 on the pin 22 as a pivot and forcing the lever 116 inwardly. This permits the fluid to enter the passage 88 whence it passes through the tube 81 to the interior of the inner piston rod 77 and thence through the passage 90 to the space between the pistons. This causes relative movement of the piston rods 77 and 79, the outer piston rod 79 being extended with respect to the inner piston rod. The connection of the collar 128 to the inner piston rod through the medium of pin 127 causes this collar to move on the outer piston rod and the yoke 134 is moved rearwardly with respect to the outer piston rod, swinging the dipper arms 140 in a counter clockwise direction and swinging the dipper in an arc of a circle toward the bank or pile to be dug in what may be termed a "scooping" operation. This operation may be repeated several times to insure filling the dipper, if necessary. During the forward movement of the dipper, the extensions 216 of the dipper beams engage the dipper lid 144, forming a brace therefor. The lid is retained in position by the latches 143 and the latch bar 145.

At the end of the digging operation, the piston rods are in a partially extended position and the guide arms 162 and the yoke 168 have moved about the shaft 164 in a counter clockwise direction, as stated. The fluid in the dash pot cylinders 174 prevents the yoke 168 from being lowered. When the lower end of the guide lever passes over the rear portion of the base, the latches 205 are depressed against the tension of the spring 207. The latches immediately return to normal position and will prevent rearward movement of the guide arm until they are released.

At the end of the digging operation, the dipper is ready to be elevated to dump the load in a car or other vehicle arranged beside the shovel. The valve 111 is then revolved in a counter clockwise direction to connect the passages 88 and 89 to the exhaust port 98 and connect the forward end of the cylinder to the source of pressure. The fluid entering the forward end of the cylinder moves the pistons 75 and 76 rearwardly in the cylinder and the dipper beams 153 and the dipper move with the pistons and piston rods. At the beginning of this movement, the guide arms 162 begin to swing in an arc of a circle in a reverse direction from their movement during the crowding operation and the pull exerted on the lever 170 by the dipper beams tends to move the yoke 168 to its original position. The yoke, however is locked against movement in this direction by the piston rods 173 of the dash pot mechanism and the force exerted causes the cylinder and cylinder yoke to swing about the trunnion 69 as a pivot and assume the broken line position shown in Figure 1 of the drawings. This action continues with the dash pot mechanism forming the restraining influence to prevent the return of the parts to their initial position and causing the cylinder to be elevated until the guide arms 162 are moved a sufficient distance rearwardly to cause the lower ends 208 to engage the latches 205. The continued introduction of fluid into the forward end of the cylinder then causes the cylinder, dipper and associated parts to swing to a fully elevated position, shown in Figure 1 of the drawings, the latches 205 preventing further rearward movement of the guide arms 162 and the point of engagement of the guide arms 162 and the latches serving as a fulcrum during the latter part of the elevating movement. The dash pot mechanism then ceases to serve as supporting means and are driven further upwardly as the parts move to a fully elevated position. At the end of the elevating movement, the extensions 204 on the sides of the cylinder yoke engage the arcuate faces 203 on the block 202. With the parts in the elevated position, the entire upper frame is revolved on the base to permit the dipper to be extended laterally or at an angle to its original position over a car or other vehicle into which the contents of the dipper are to be dumped. This is accomplished by admitting air to the engine cylinders 31, the introduction of air being controlled by the valve 51 through the medium of the handle 60 arranged on the operator's platform 221. The piston rods 31 drive the crank 27 to rotate the pinion 21 and this pinion in turn rotates the pinion 22 which is in engagement with the ring gear 17, causing the rings 6 and 7 to revolve on the stationary base and thus turn the frame on which the cylinder and other parts are supported.

At the end of the revolving step, when the cylinder, dipper and associated parts are arranged at the desired angle to the base, fluid is again admitted to the inner end of the cylinder to move the pistons in the cylinder and force the piston rods outwardly. This is known as the reaching operation and is for the purpose of forcing the dipper outwardly to a position over the car or other vehicle into which the contents of the dipper are to be dumped. During the reaching operation, the engagement of the lateral extensions 204 and the arcuate faces 203 prevents rearward movement of the bushings 68 in the guides and takes up the thrust. By retaining the bushings 68 at the forward ends of the guides, the full advantage of the piston rod extension is obtained during the reaching step. The cable 218 which controls the latch bar of the dipper lid extends around the idler pulley 219' which is at all times substantially the same distance from the hub 171 and then extends around the hub 171 and the hub formed at the other end of the arm 170. From this point, the cable extends to the bracket 220' on the frame and the tautness of the cable is controlled by the distance from the bracket 220' to the outer end of the yoke 168. During the elevation of the cylinder, dipper and associated parts, the yoke 168 revolves in a counter-clockwise direction and travels away from the bracket 220' which causes any slack in the cable to be taken up and the cable becomes taut. During the reaching operation, the cable remains in this taut condition and when the dipper is oscillated on its pivots 151 for dumping, the cable exerts a pull on the latch bar 145 against the tension of spring 146 to release the ends of the latch bar from the latches 143. The dipper lid is then free to revolve about the pivot pins 151 as an axis and when the dipper is oscillated, the weight of the material forces the dipper lid away from the top of the dipper and permits the material to be dumped. The oscillation of the dipper during the dumping operation is caused by admitting air into the cylinder between the pistons in a manner similar to the digging operation heretofore described.

At the end of the dumping operation, the parts are returned to the original elevated position by admitting air to the forward end of the cylinder. The apparatus is then in condition to be returned to its original position and the operator depresses the pedal 214 which revolves the shaft 213 and causes the shaft 206 to be rotated through the cranks 209 and 212 and the link 211. The latches 205 are then depressed against the tension of the spring 207, disengaging the latches from the lower ends of the guide arms 162. Further movement of the shaft 213 causes the crank 215 to engage lever 196 and unseat the valve 190. This permits the oil in the cylinders 174 to return to the reservoir 175, releasing the dash pot mechanism. The cylinder, dipper and associated parts are then free to return to their original positions, and during the lowering of the parts, the dash pot mechanism serves as cushioning means. By controlling the speed of the flow of oil from the cylinders, the speed at which the parts are lowered may be regulated.

The cup-shaped members 91 and 107 arranged in the opposite ends of the cylinder serve to entrap a certain amount of air in the ends of the cylinder, and form cushions for the pistons when the pistons reach the ends of a stroke. The air is normally passed into the cylinder through the openings 93 and 108 in the inner ends of the cup-shaped members, which openings are normally disposed a slight distance from the cylinder heads. The springs 95 and 109 normally retain the parts in the position shown. As the piston moves toward the end of the cylinder, the face of the piston engages the inner end of the cup-shaped member and closes the air inlet opening. The air thus entrapped in the end of the cylinder forms a cushion for the piston. The spring permits the cup-shaped member to be moved inwardly by the piston and when the piston again moves outwardly away from the cylinder head, the spring returns the cup-shaped member to its normal position.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a power operated shovel, a dipper, an actuating member connected thereto, means for moving said dipper and said actuating member forwardly, a pivoted member operatively connected to said dipper, the free end of said pivoted member being adapted to be elevated when said dipper is moved forwardly, and means for locking said pivoted member in elevated position whereby application of force to said actuating member in a reverse direction causes said dipper to assume an elevated position.

2. In a power operated shovel, a dipper, an actuating member connected thereto, means for moving said actuating member and said dipper forwardly, a pivotally mounted yoke operatively connected to said dipper and adapted to be elevated when said dipper is moved forwardly, and means for locking said yoke in elevated position whereby application of force to said actuating member in a reverse direction causes said dipper to assume an elevated position.

3. In a power operated shovel, a cylinder, a piston mounted therein, a piston rod connected to said piston, a dipper arranged on the outer end of said piston rod, a pivoted member operatively connected to said piston rod, and adapted to be elevated when said piston rod is moved forwardly, and means for locking said pivoted member in elevated position whereby movement of said piston in a reverse direction will elevate said dipper.

4. In a power operated shovel, a frame, a cylinder pivotally mounted on said frame, a piston mounted therein, a piston rod connected to said piston, a dipper arranged on the outer end of said piston rod, a pivotally mounted yoke operatively connected to said piston rod and adapted to be elevated when said dipper is moved forwardly, and means for locking said yoke in elevated position whereby movement of said piston in a reverse direction will swing said cylinder on its pivot and cause said dipper to assume an elevated position.

5. In a power operated shovel, a frame, a cylinder pivotally mounted on said frame, a piston mounted therein, a piston rod connected to said piston, a dipper arranged on the end of said piston rod, longitudinally arranged dipper beams mounted on said frame and connected to said piston rod, a link connected to said beams, a pivotally mounted member connected to said link whereby outward movement of said piston will elevate said pivotally mounted member, and means for locking said pivotally mounted member in an elevated position whereby movement of said piston in a reverse direction will swing said cylinder on its pivot and elevate said dipper.

6. In a power operated shovel, a frame, a cylinder pivotally mounted on said frame, a piston mounted therein, a piston rod connected to said piston, a dipper arranged on the end of said piston rod, longitudinally arranged dipper beams mounted on said frame and connected to said piston rod, a link connected to said beams, a pivotally mounted yoke connected to said link, said link being adapted to elevate the free end of said yoke when said piston moves forwardly in said cylinder, and means for locking said yoke in elevated position whereby movement of said piston in a reverse direction will swing said cylinder on its pivot and elevate said dipper.

7. In a power operated shovel, a cylinder, a piston mounted therein, a piston rod connected to said piston, a dipper carried by said piston rod, a dipper beam operatively connected to said piston rod, a pivotally mounted guide arm connected to said beam, a latch arranged in the path of said guide arm, said guide arm being adapted to pass over said latch when said piston moves forwardly and being adapted to engage said latch when said piston moves in a reverse direction to elevate said dipper.

8. In a power operated shovel, a dipper, an actuating member connected thereto, means for moving said actuating member and said dipper forwardly, a pivoted member operatively connected to said dipper, the free end of said member being adapted to be elevated when said dipper is moved forwardly, and dash pot mechanism connected to said member to retain it in elevated position whereby application of force to said actuating member in a reverse direction causes said dipper to assume an elevated position.

9. In a power operated shovel, a dipper, an actuating member connected thereto, means for moving said dipper and said actuating member forwardly, a pivotally mounted yoke operatively connected to said dipper and adapted to be elevated when said dipper is moved forwardly, a piston rod connected to said yoke, a pivotally mounted cylinder arranged beneath said yoke, a piston mounted in said cylinder and connected to said piston rod, and a suction operated valve arranged in said cylinder and adapted to be opened by the upward movement of said piston, whereby said yoke is retained in an elevated position and rearward movement of said actuating member causes said dipper to assume an elevated position.

10. In a power operated shovel, a dipper, an actuating member connected thereto, means for moving said dipper and said actuating member forwardly, a pivoted member operatively connected to said dipper, the free end of said member being adapted to be elevated when said dipper is moved forwardly, a pivotally mounted cylinder arranged beneath said pivoted member, a liquid reservoir communicating with said cylinder, a piston mounted in said cylinder, a piston rod secured thereto and connected to said pivoted member, and a suction operated valve adapted to be opened upon upward movement of said piston.

11. In a power operated shovel, a cylinder, a piston mounted therein, a piston rod connected to said piston, a dipper arranged on the outer end of said piston rod, a pivoted member operatively connected to said piston rod and adapted to be elevated when said piston rod is moved forwardly, a pivotally mounted cylinder arranged beneath said pivoted member, a piston mounted in said cylinder, a piston rod secured to said piston and connected to said pivoted member, a reservoir communicating with said cylinder, and a suction operated valve controlling communication between said cylinder and said reservoir, said valve being adapted to be opened upon upward movement of said piston.

12. In a power operated shovel, a frame, a cylinder pivotally mounted on said frame, a piston mounted therein, a piston rod connected to said piston, a dipper arranged on the outer end of said piston rod, a pivotally mounted yoke operatively connected to said piston rod and adapted to be elevated when said dipper is moved forwardly, a pivotally mounted cylinder arranged beneath said yoke, a liquid reservoir communicating with said cylinder, a piston mounted in said cylinder, a piston rod secured thereto and connected to said yoke, and a suction operated valve adapted to be opened upon upward movement of said piston.

13. In a power operated shovel, a frame, a cylinder pivotally mounted on said frame, a piston mounted therein, a piston rod connected to said piston, a dipper arranged on the end of said piston rod, longitudinally extending dipper beams connected to said piston rod, a link connected to said beams, a pivotally mounted member connected to said link whereby outward movement of said piston will elevate said pivotally mounted member, a pivotally mounted cylinder arranged beneath said pivotally mounted member, a liquid reservoir communicating with said cylinder, a piston mounted in said cylinder, a piston rod secured thereto and connected to said pivotally mounted member, and a suction operated valve adapted to be opened upon upward movement of said piston.

14. In a power operated shovel, a frame, a cylinder pivotally mounted on said frame, a piston mounted therein, a piston rod connected to said piston, a dipper arranged on the end of said piston rod, longitudinally arranged dipper beams connected to said piston rod, a link connected to said beams, a pivotally mounted yoke connected to said link, said link being adapted to elevate the free end of said yoke when said piston moves forwardly in said cylinder, a pivotally mounted cylinder arranged beneath said yoke, a liquid reservoir communicating with said cylinder, a piston mounted in said cylinder, a piston rod secured thereto, and connected to said yoke, and a suction operated valve adapted to be opened upon upward movement of said piston.

15. In a power operated shovel, a cylinder, a pair of pistons mounted in said cylinder, piston rods connected to said pistons, one of said piston rods being arranged within the other, a cross head carried by the outer piston rod, a dipper pivotally connected to said cross head, a collar slidably mounted on said outer piston rod and connected to the inner piston rod to move therewith, and a yoke connecting said collar to said dipper to swing said dipper on its pivot upon relative movement of said pistons.

16. In a power operated shovel, a cylinder, a pair of pistons mounted in said cylinder, piston rods connected to said pistons, one of said piston rods being arranged within the other, the outer piston rod being provided with a slot, a pin carried by the other piston rod and projecting through said slot, a cross head carried by the outer piston rod, a dipper pivotally mounted on said cross head, a collar surrounding said outer piston rod and connected to said pin, and a yoke carried by said collar and connected to said dipper.

17. In a power operated shovel, a frame, a yoke pivotally mounted in said frame, a cylinder carried by said yoke, a piston mounted in said cylinder, a piston rod connected to said piston and extending from said cylinder, and a dipper carried by said piston rod.

18. In a power operated shovel, a frame, comprising a pair of side members, each of said members being provided with recesses having substantially parallel faces forming guides, bushings mounted in said guides, said bushings being provided with flat upper and lower faces adapted to contact with the parallel faces of said guides, a trunnion mounted in said bushings, a yoke carried by said trunnion, and a power cylinder mounted in said yoke.

19. In a power operated shovel, a frame comprising a pair of side members, each of said members being provided with recesses having substantially parallel faces forming guides, bushings mounted in said guides, said bushings being provided with flat upper and lower faces adapted to contact with the parallel faces of said guides, a trunnion mounted in said bushings, a yoke carried by said trunnion, a power cylinder mounted in said yoke, and a depending arm carried by said yoke and adapted to engage a portion of the frame when said bushings move rearwardly in said guides.

20. In a power operated shovel, a frame comprising a pair of side members, each of said members being provided with recesses having substantially parallel faces forming guides, bushings mounted in said guides, said bushings being provided with flat upper and lower faces adapted to contact with the parallel faces of said guides, a trunnion mounted in said bushings, a yoke carried by said trunnion, a power cylinder mounted in said yoke, blocks formed on the inner sides of said frame, said blocks being provided with faces curved on a radius from the center of said trunnion when said trunnion is in its extreme forward position in said guide, and lateral extensions formed on the sides of said yoke and adapted to engage said curved faces.

21. In a power operated shovel, a frame comprising a pair of side members, a trunnion mounted in said frame, a sleeve surrounding said trunnion, a cylinder supporting yoke carried by said sleeve, a power cylinder mounted in said yoke, means for connecting the interior of said trunnion to a source of fluid under pressure, said sleeve and said trunnion being provided with ports, passages connecting said ports to the opposite ends of said cylinder, and a valve mounted in said trunnion.

22. In a power operated shovel, a frame comprising a pair of side members, a trunnion mounted in said frame, a sleeve surrounding said trunnion, a cylinder supporting yoke carried by said sleeve, a power cylinder mounted in said yoke, means for connecting the interior of said trunnion to a source of fluid under pressure, said sleeve and said trunnion being provided with ports, passages connecting said ports to the opposite ends of said cylinder, a combined reciprocating and oscillating valve arranged in said trunnion, and a lever connected to said valve and extending from said trunnion.

In testimony whereof, I affix my signature.

ROBERT S. BUTLER.